United States Patent [19]

Driver

[11] Patent Number: 5,318,395
[45] Date of Patent: Jun. 7, 1994

[54] METHOD AND APPARATUS FOR PORTING LATERAL CONNECTIONS IN LINED PIPELINES

[75] Inventor: Franklin T. Driver, Memphis, Tenn.

[73] Assignee: Insituform Technologies, Inc., Memphis, Tenn.

[21] Appl. No.: 936,768

[22] Filed: Aug. 27, 1992

[51] Int. Cl.$^5$ .................................................. B23C 3/00
[52] U.S. Cl. ........................................ 409/132; 83/177; 166/55.6; 166/55.8; 409/143
[58] Field of Search ............... 166/55.8, 55.7, 55.6, 166/55, 55.2; 409/132, 143, 175, 179, 180; 83/177; 29/26 A, 26 B

[56] References Cited

U.S. PATENT DOCUMENTS 4,648,454  3/1987  Yarnell .................. 166/55.7
4,819,721  4/1989  Long, Jr. ................ 166/55
5,197,540  3/1993  Yagi et al. ............. 166/55.8

FOREIGN PATENT DOCUMENTS 193116   8/1989  Japan ...................... 409/143
303800  12/1990  Japan ....................... 83/177

Primary Examiner—Daniel W. Howell
Attorney, Agent, or Firm—Michael I. Wolfson

[57] ABSTRACT

A method and apparatus for porting lateral connections in a lined pipeline from the lateral side of the liner. An access hole is formed through the liner material covering the lateral connection. A cutting apparatus, such as a water cutter, is inserted through the access hole with the nozzle directed back towards the liner. Alternatively, the cutting apparatus can be fed through the lateral towards the lined opening. The inside surface of the lateral pipe is then used as a guide to aim the water jet at the precise location where the cut is desired as the nozzle is revolved around the inside surface of the lateral to cut the liner to the shape of the connection opening.

28 Claims, 7 Drawing Sheets

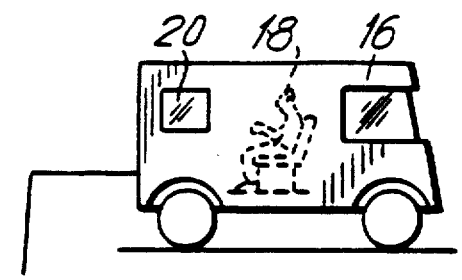
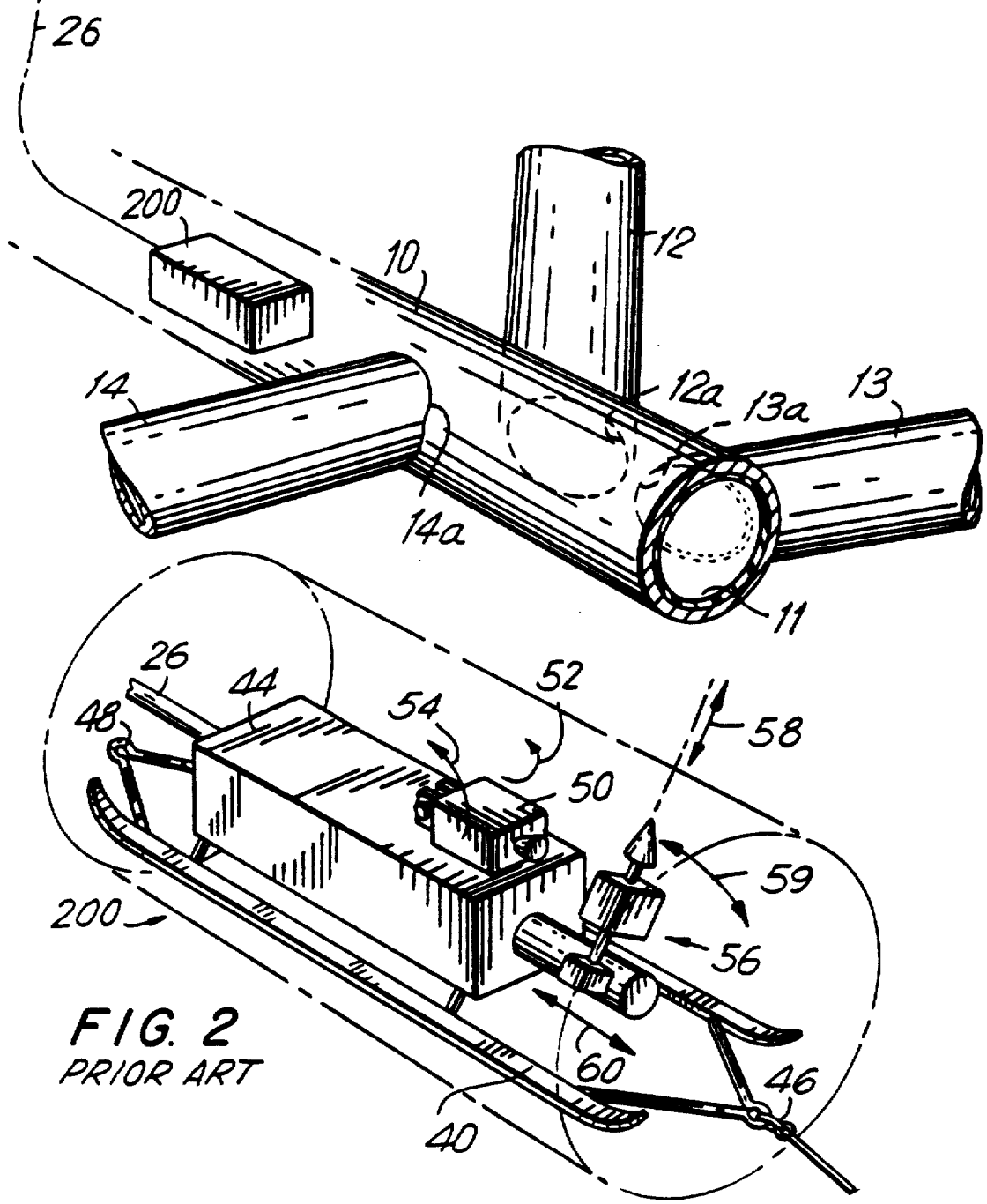
FIG. 1
FIG. 2
PRIOR ART

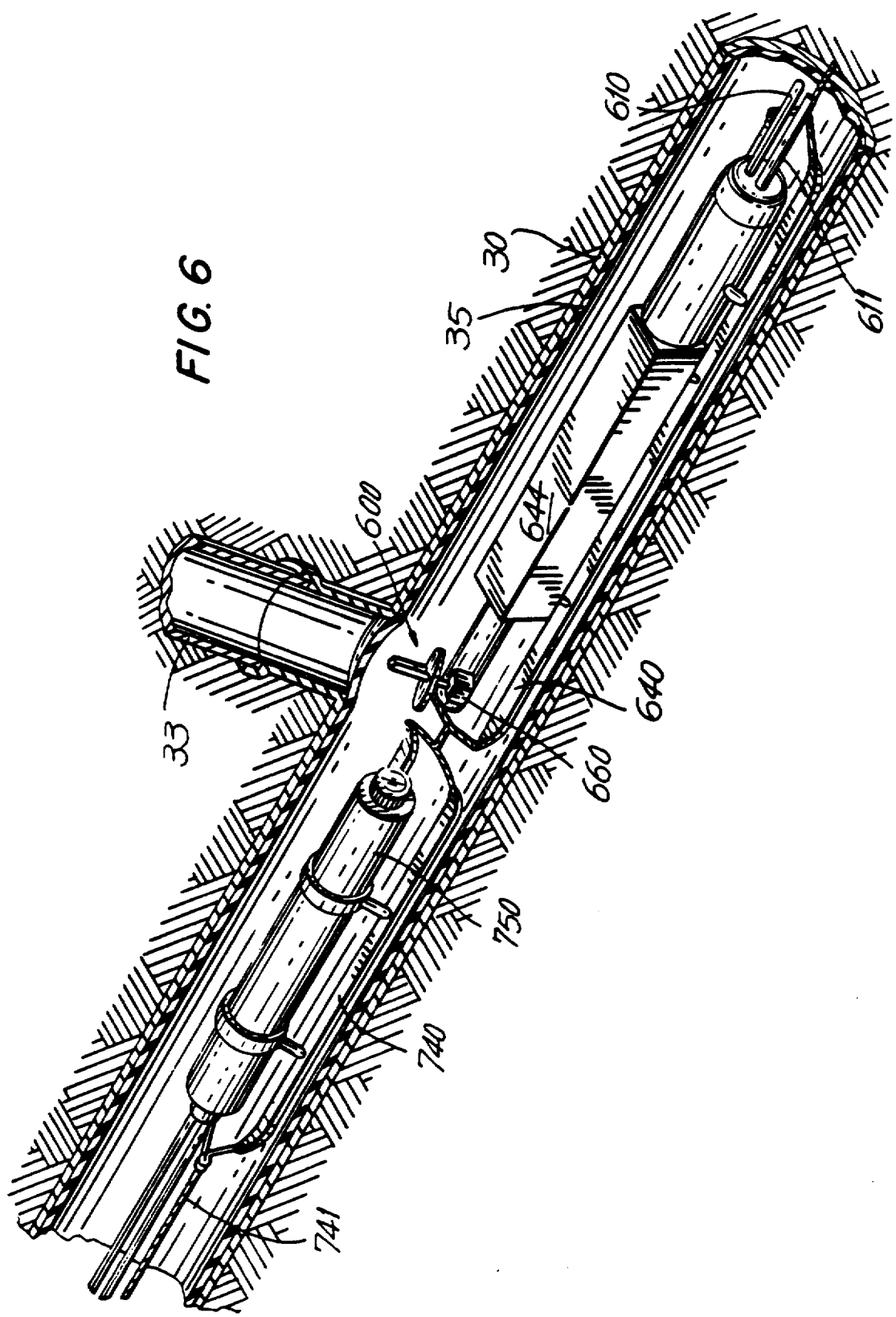

METHOD AND APPARATUS FOR PORTING LATERAL CONNECTIONS IN LINED PIPELINES

BACKGROUND OF THE INVENTION

The invention relates generally to cutting apertures in the lining material of lined conduits, such as for reestablishing side connections of a pipeline to lateral pipes, and more particularly to a method and apparatus for forming those apertures in an automated manner.

Conduits for water, sewage and other liquids frequently require repair because of leakage and various types of other structural failure. The leakage may be due to aging, cracking or corrosion. A common way to repair the existing pipeline is to uncover and remove the existing pipeline, replace it, then reconnect the new pipeline to the various lateral pipes emptying into the pipeline.

It is becoming common to repair aging pipelines with what is referred to as trenchless technology. A structurally independent replacement pipe is installed within the existing pipeline by pushing or pulling it through the pipeline without uncovering or removing the aged pipeline. Such processes are described in U.S. Pat. Nos. 4,009,063, 4,064,211 and 4,867,921, the contents of which are incorporated herein by reference. It is also becoming common to install nonstructural linings within existing pipelines to protect the existing pipelines from corrosion. For example, thin polymer tubes can be installed within existing pipelines that are exposed to corrosive fluids and thereby extend the life of the existing pipelines. This can be a highly cost effective approach, compared to the complete replacement of a pipeline system.

A drawback to this "pipe-within-a-pipe" technology is that after the liner (or replacement pipe) has been installed, it will cover openings in the existing pipeline which act as side or branch connections to lateral pipes. Laterals are smaller pipes of typically 4 to 6 inches in diameter. For example, a sewer line might run along a street and lateral lines will run from homes to feed sewage into the main line. These lateral connections must be reestablished after the existing pipeline is lined so that the existing pipeline can function as it did prior to the repair operation. This entails locating the lateral connections and cutting an opening in the liner to reestablish the lateral connection ("porting the lateral").

A conventional way of reestablishing the lateral connections by porting the laterals is described in U.S. Pat. Nos. 4,648,454 and 4,577,388, the contents of which are incorporated herein by reference. A sled containing a video camera and a cutting device is pulled through the re-lined pipeline. If the liner is of appropriate construction and is installed under appropriate conditions, the location of the lateral connections will appear as dimples on the inside wall of the replacement pipe and can be detected visually. Otherwise, the location of the lateral connection can be determined prior to installation of the liner or by various other methods that are well known in the art. Once the lateral connection opening is located, an operator will control the cutting with a mechanical cutter from the inside of the lined pipe to the lateral pipe by viewing a remote video image of the cutting operation and re-establishing the connection.

It also has been proposed to employ a water cutting system for opening lateral connections. As in the case of a mechanical cutting blade, a water cutting system projects a high pressure water stream from the inside of the conduit against the pipe wall to open the lateral connection. Optionally, abrasive material is dispersed in the water. A slightly oval shape can be achieved by moving the water jet from side to side. This system has not been widely accepted for commercial uses, due in part to the inability to control the cutting pattern with sufficient accuracy and because the depth of the cut cannot be controlled precisely. The water jet frequency cuts not only the liner material but can cause substantial damage to the wall of the lateral pipe once the jet begins breaking through the liner material.

Accordingly, despite considerable efforts in the development of apparatuses for porting laterals, the commercially available methods rely primarily on the skill of the operator controlling a mechanical cutting device, the quality of his visual reference and the precision by which the cutting device will respond to the operator's remote instructions. Accordingly, it is desirable to provide a method and apparatus for porting laterals in replacement pipe which overcome the deficiencies described above.

SUMMARY OF THE INVENTION

Generally speaking, in accordance with the invention, a method and apparatus for porting lateral connections in a lined pipeline by cutting from the lateral side of the liner is provided. An access hole is formed through the liner material covering the lateral connection. A cutting apparatus, such as a water cutter, is inserted through the access hole with the nozzle directed back towards the liner. Alternatively, the cutter can be fed to the connection from the lateral. The inside surface of the lateral pipe is then used as a guide to aim the water jet at the precise location where the cut is desired as the nozzle revolves around the inside surface of the lateral to cut the liner to the shape of the connection opening.

Accordingly, it is an object of the invention to provide an improved method for porting laterals by cutting from the lateral side of the pipe.

Another object of the invention is to provide an improved cutting apparatus for porting laterals by cutting from the lateral side of the pipe.

A further object of the invention is to provide a method for porting laterals that is less dependent on the skill of an operator.

Yet another object of the invention is to provide an improved apparatus for porting laterals regardless of the intersection angle of the lateral to the main pipeline.

Still another object of the invention is to provide a reliable apparatus for porting laterals that is inexpensive and not difficult to maintain.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure and drawings, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic view of a section of an underground pipeline network having various lateral connections;

FIG. 2 is a perspective view of a conventional viewing and cutting apparatus for porting a lateral;

FIG. 6 is a perspective view of a viewing and water cutting apparatus constructed in accordance with an embodiment of the invention;

DESCRIPTION OF THE PREFERRED EMBODIMENTS

Figure 3:
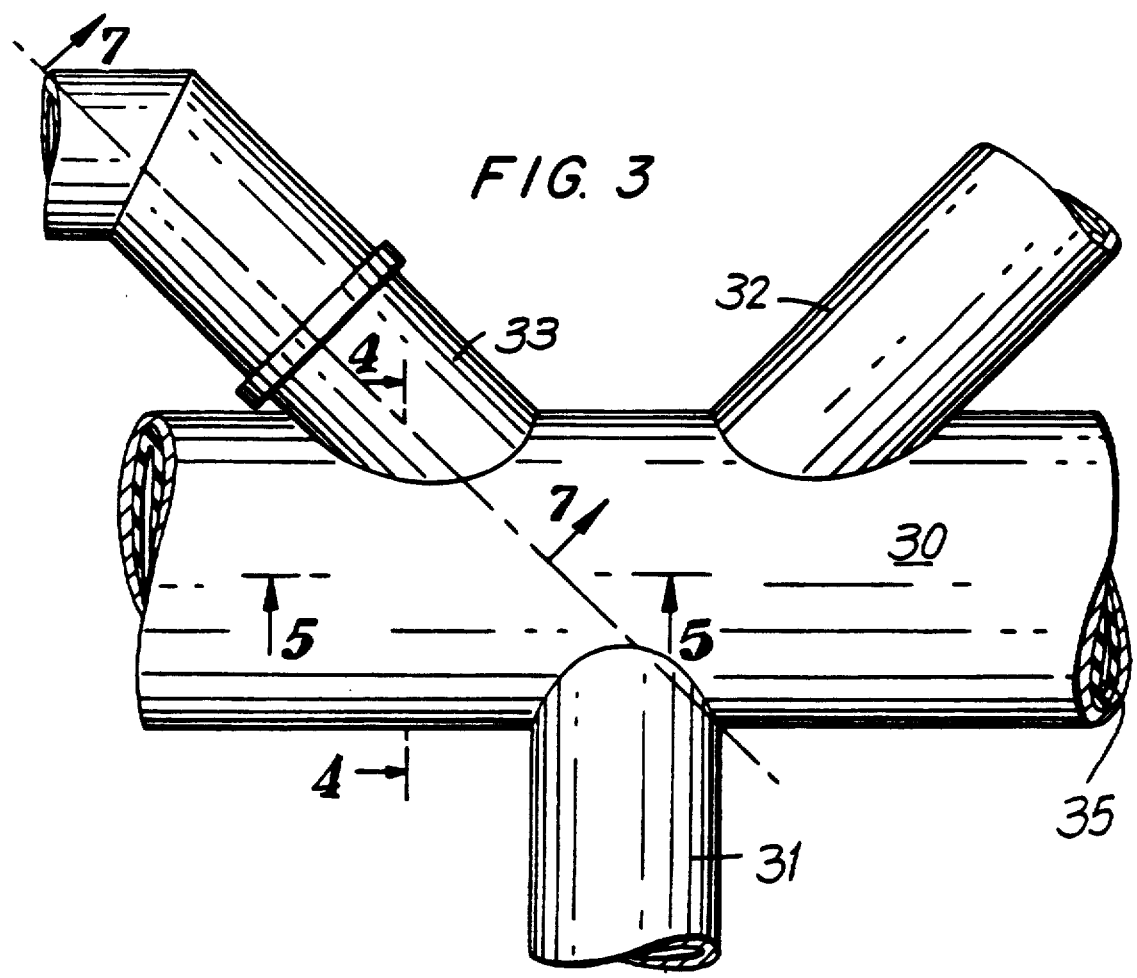
FIG. 3 is a perspective view of an existing pipeline having laterals connected thereto.

An apparatus for porting laterals constructed and arranged in accordance with the invention uses the inside surface of the lateral pipe as a guide to cut an opening in the liner of the precise shape necessary to open the lateral connection with the main pipeline or conduit. The covered lateral is located and a hole is formed in the liner at approximately the center of the covered opening. A cutting apparatus is introduced through the hole to the lateral side of the liner and has a cutting head which doubles back to face the liner. Alternatively, the cutter is fed to the connection from the lateral towards the main pipeline. When the cutter is activated the head is biased against the inside of the lateral wall thereby using the inside of the lateral as a guide. The cutter moves around the inside surface of the lateral to cut the liner precisely where the liner meets and covers the lateral.

The cutter preferably includes an elongated insertion portion and a cutting portion or head. The insertion portion passes through the hole in the liner for inserting the cutting portion to the inside of the lateral. This can be accomplished with a first insertion portion for inserting the cutting device and a second wing like portion for reaching the inner wall of the lateral and urging the cutting portion towards the side of the lateral. The first and second portion can be hinged so that the cutter can be inserted through a relatively small hole and then the second wing portion can swing away from the first portion towards the inside wall of the lateral.

The cutting portion includes a cutting member, such as a router bit or the nozzle of a water cutter, and is coupled to the end of the second wing portion by a hinged coupling. In this manner, the cutting section can lay parallel along the inside wall of the lateral pipe, even if the first portion is not centered in the lateral or parallel to the central axis of the lateral.

FIG. 1 show an existing pipeline 10 having a replacement pipe 11 installed therein. Lateral pipes 12, 13 and 14 intersect pipeline 10 at lateral connection openings 12a, 13a and 14a, respectively. Lateral pipe 14 intersects pipeline 10 at right angles and therefore, connection opening 14a is a circular opening. It is relatively simple to cut a circular hole corresponding to connection opening 14a once the inside diameter of lateral pipe 14 is determined.

Lateral pipe 12 intersects pipeline 10 at an acute angle. Consequently, connection opening 12a is elliptical in shape. This presents considerable difficulties in cutting away portions of replacement pipe 11 to uncover connection opening 12a without causing unwanted damage.

The connection is typically opened with a remotely controlled cutting apparatus 200, shown in FIG. 2. Cutting apparatus 200 includes a pair of skids 40 which support a chassis 44 having appropriate drive motors therein. A pull shackle 46 is located at one end of the unit and it is mounted on skids 40. A similar shackle 48 is mounted at the other end of skids 40. A video camera 50 is mounted on chassis 44 to provide video images of the interior of replacement pipe 11 and an operator 18 (FIG. 1) watching a video screen 20 within a remote location such as a vehicle 16 controls the operation of cutting apparatus 200 by sending control signals through a cable 26. The camera is mounted so that it can pivot about 2 orthogonal axes, as shown by arrows 52 and 54 so that any location within lining 11 can be viewed.

One end of chassis 44 includes a cutter 56 which can be driven about an axis 58. Cutter 56 can be pivoted about the axis of pipeline 10 or an axis parallel thereto as illustrated by an arrow 59. In order to provide cutter 56 with universal movement, cutter 56 can be moved axially of the pipe as indicated by an arrow 60. This method or porting laterals is not fully satisfactory. Porting a lateral with apparatus 200 requires considerable skill and time on the part of operator 18 and errors can be quite costly. Furthermore, the machinery involved is quite costly.

Figure 4:
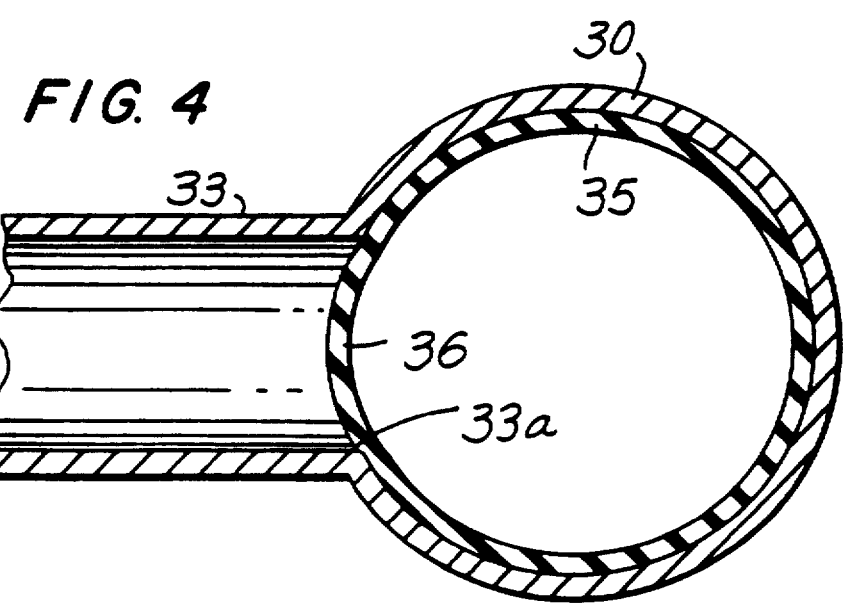
FIG. 4 is a cross-sectional view of the pipeline shown in FIG. 3 taken along line 4—4.

An existing pipeline 30 having a plurality of coupled lateral connecting pipes 31, 32 and 33 is shown in FIG. 3. A cross-sectional view of pipe 30 and lateral 33 taken through line 4—4 is shown in FIG. 4. Pipeline 30 is lined with a replacement pipe liner 35 along its interior length. As shown in FIG. 4, liner 35 covers opening 33a connecting lateral 33 to pipeline 30. Liner 30 includes a dimpled portion 36 which acts as a visual indication of the position of a lateral connection opening 33a. Alternatively, the location of lateral connection opening 33a can be determined by magnetic, electrical or audio methods and the like or by recording the location before pipe 30 is lined, as is well understood in the art.

Figure 5:
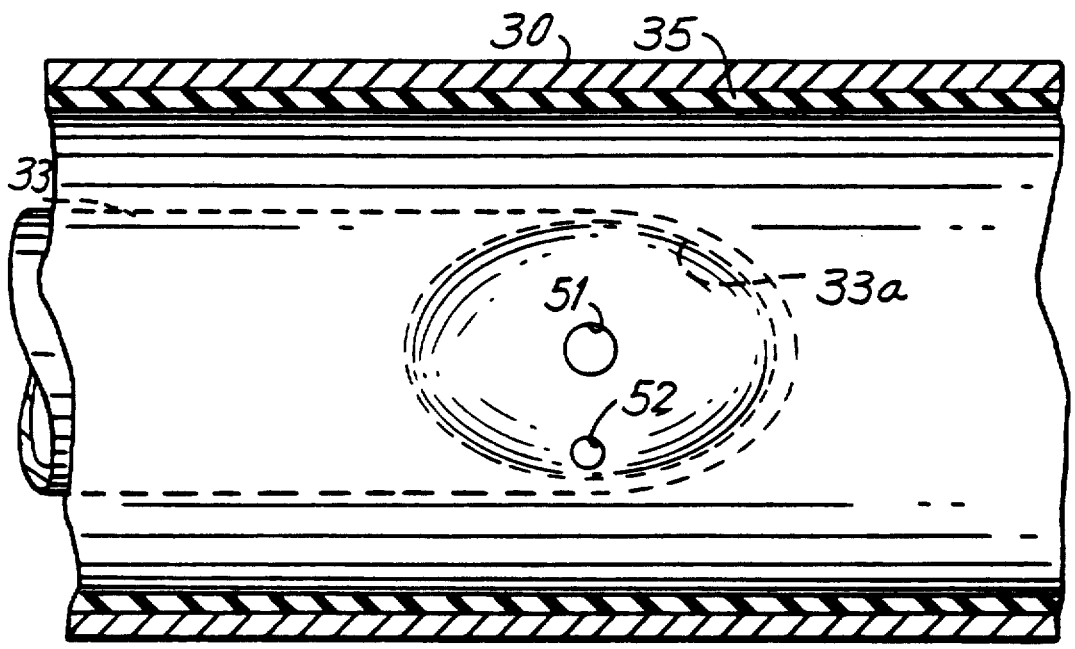
FIG. 5 is a cross-sectional view of the pipeline of FIG. 3 taken through line 5—5, illustrating the first step of the method for porting a lateral in accordance with one embodiment of the invention.

The first step in porting the lateral in accordance with a first embodiment of the invention is illustrated in FIG. 5. A hole 51 is bored through liner 35 in approximately the center of dimpled portion 36 at connection opening 33a. A drain hole 52 through dimpled portion 36 is also formed near the bottom of opening 33a. Holes 51 and 52 can be formed by a conventional cutting apparatus from the inside of pipe 30, such as cutter 56 of cutter assembly 200.

Figure 7:
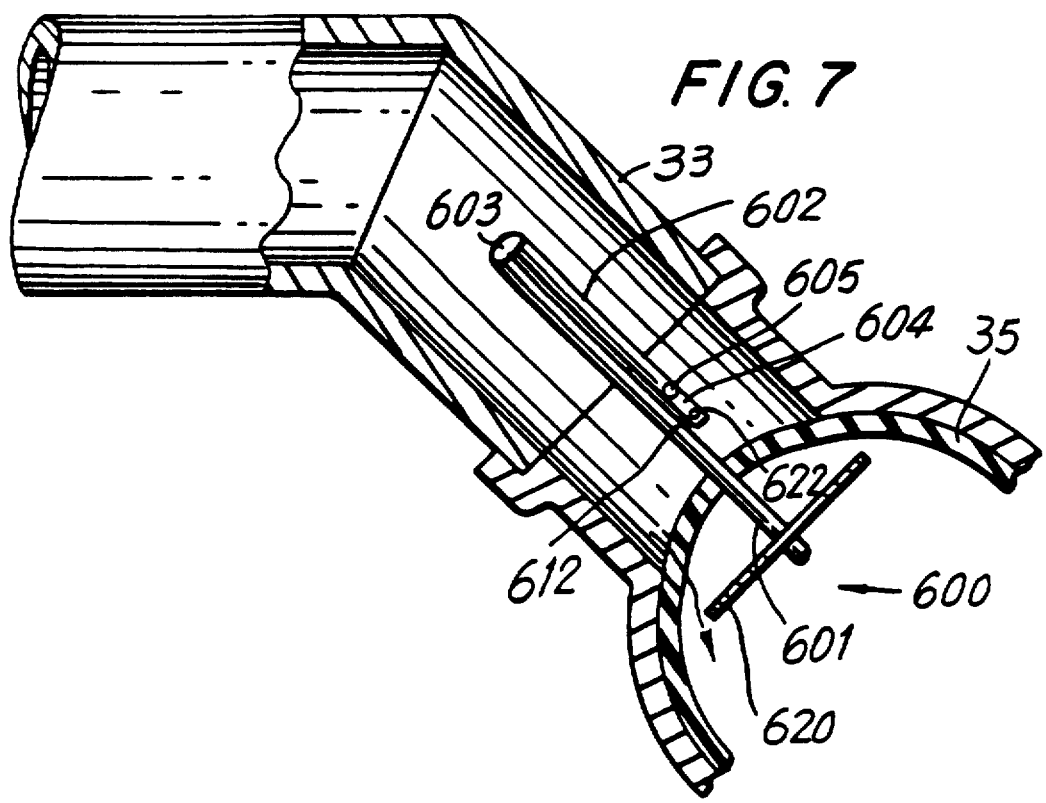
FIG. 7 is a cross-sectional view of the pipeline of FIG. 3, showing operation of the water cutting device of FIG. 6 taken along line 7—7.
Figure 8:
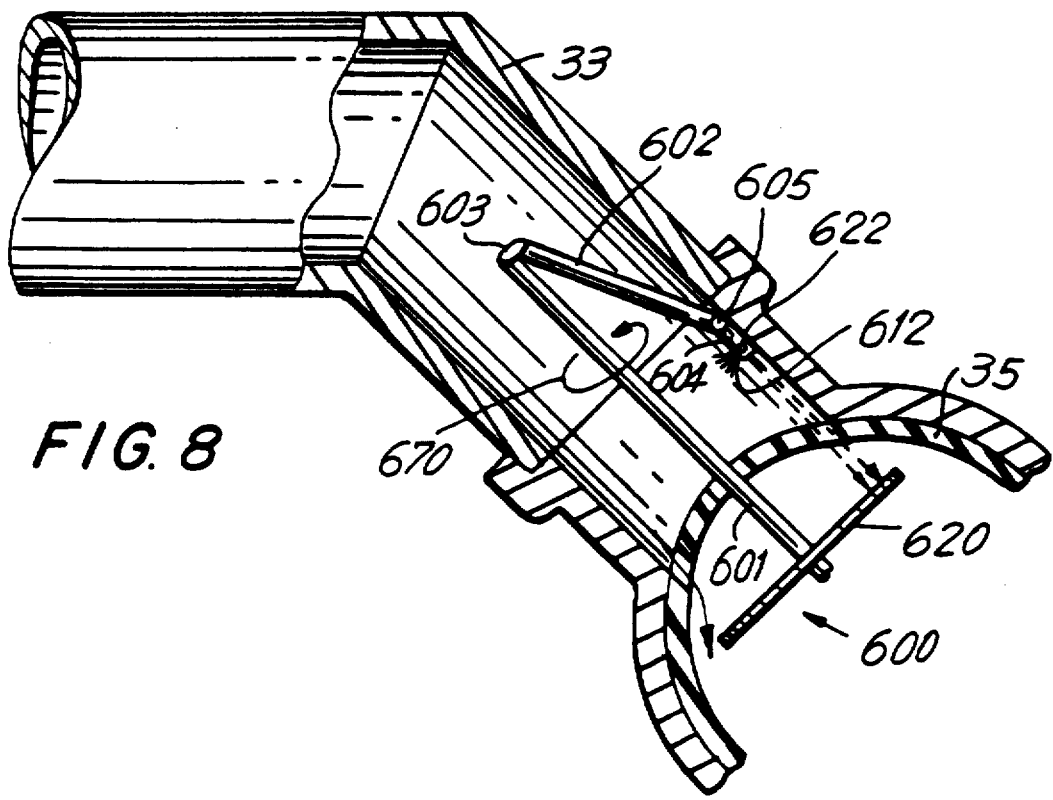
FIG. 8 is a cross-sectional view of the pipeline as in FIG. 7 showing the water cutting apparatus in use.

The lateral is then ported by inserting a cutting apparatus through hole 51 and using the inner wall of lateral 33 to guide the cutter as it revolves around the inside wall of lateral 33. Referring to FIGS. 6, 7 and 8, a suitable water cutter 600, constructed in accordance with an embodiment of the invention is shown connected to a chassis 644, which is similar to chassis 44 of FIG. 2. Throughout the application, identical structures will be assigned the same reference numerals. Chassis 644 is mounted on a pair of skids 640. Cutter 600 is controlled from a remote location by a cable 610 and has a water hose 611 coupled to the rear end for supplying water thereto. A video camera 750 is mounted on a pair of skids 740, which are coupled to skids 640 and is pulled through pipe 30 by a rope 741. Skids 640 are linked to skids 740 so that chassis 644 is pulled through pipe 30 by pulling on rope 741. Chassis 644 includes a universal arm apparatus 660 for inserting cutter 600 through hole 51 as shown in FIG. 7 and rotating cutter 600 within lateral 33 as shown in FIG. 8.

Referring to FIGS. 7 and 8, water cutter 600 includes a first elongated insertion member 601 and a second shorter wing member 602 coupled by a hinge 603. Insertion member 601 and wing member 602 are in fluid communication. A water jet nozzle 604 is coupled to and in fluid communication with the end of wing 602 by a pivotable coupling 605. As shown in FIG. 7, when water cutter 600 is in a relaxed position, wing 602 and nozzle 604 lay against insertion member 601 so that they can be easily inserted through hole 51.

Referring to FIG. 8, once nozzle 604 is inside the cavity formed by lateral pipe 33 and liner 35, water or other suitable fluid is fed to cutter 600 by hose 611. An abrasive material such as grit may be added to the water or fluid to speed the cutting procedure. The high pressure fluid will cause insertion member 601 and wing 602 to separate as water cutter 600 begins to straighten out. Thus, nozzle 604 coupled to wing 602 by hinge 605 will be urged against and contact the inside wall of lateral 33. Nozzle 604 will be parallel to the inside wall of lateral 33 and pointed directly at the portion of liner 35 to be cut away. It is preferable to position the end of nozzle 604 about an inch or so from liner 35. Placement of nozzle 604 can be assisted by including graduation markings on member 601.

In order to cut a complete opening, elongated insertion member 601 is rotated as shown by an arrow 670 such as by physically rotating hose 611 so that nozzle 604 will travel completely around the inner surface of lateral 33 and cut through liner 35 in the precise shape desired. Nozzle 604 can include a side nozzle 612 to provide sideways force and thereby ensure that nozzle 604 is pressed firmly against the inner wall of lateral 33. Nozzle 604 may also include a rotation nozzle 622 to provide force to spin nozzle 604 around the inside of lateral 35 without any externally generated force.

Figure 9:
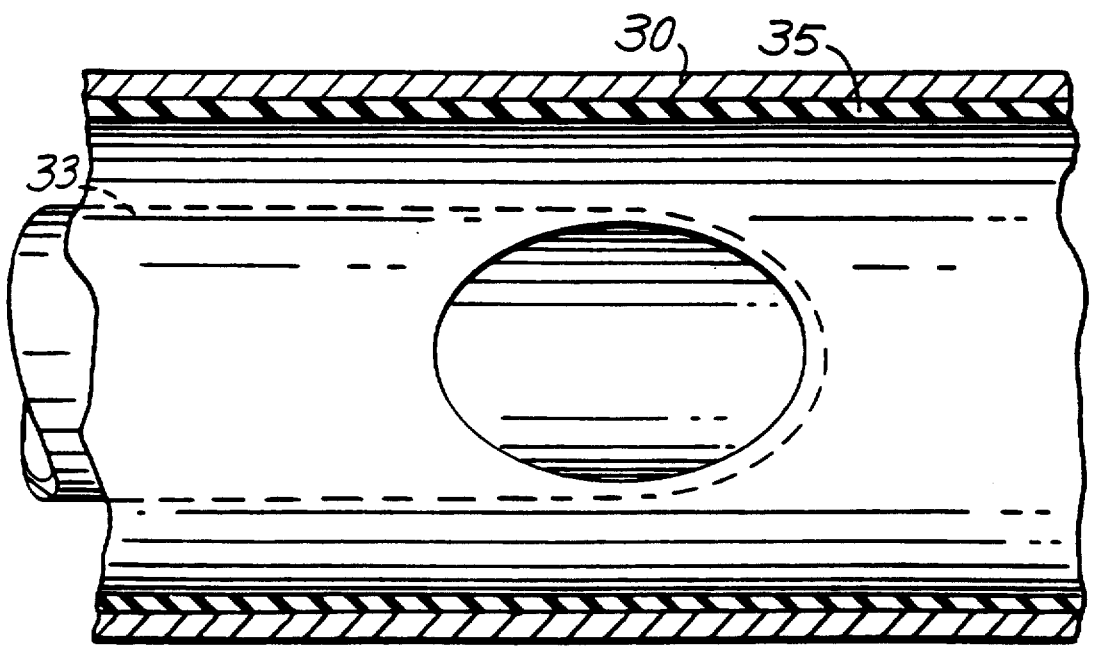
FIG. 9 is a side cross-sectional view of the pipeline of FIG. 3 taken along line 5—5 after the lateral is ported.

Cutter 600 may also include a shield 620 to intercept the jet of water passing through liner 35. This protects the inner wall of liner 35. The operator need do nothing more than rotate elongated member 601 to complete the cutting operation. By having cutting head 604 ride on the inner wall of lateral 33 a perfect lateral opening having the precise shape of opening 33a can be cut. This dramatically reduces the skill needed for an operator to make an appropriate cut to yield the ported lateral shown in FIG. 9.

The cutter can also include a spring mechanism or remotely controlled push rods to cause nozzle 604 to be pressed firmly against the inner wall of lateral 33. Arms 601 and 602 can also be spring loaded so that they will return to the slim profile arrangement of FIG. 7 when the water flow is stopped.

It will also be understood that other methods of cutting liner 35 from the lateral side may be used. This includes the use of commonly available router bits spaced slightly from the inside surface of the lateral substituted for nozzle 604. This will be effective so long as the path of the router is guided by the inner wall of the lateral pipe and cutting is directed from the lateral side of the pipeline so that a simple rotating action will track the inside of lateral 33 and cut an opening of the desired shape. However, the water cutting method provides advantages and will be more easy to operate compared to the use of a router bit.

Figure 10:
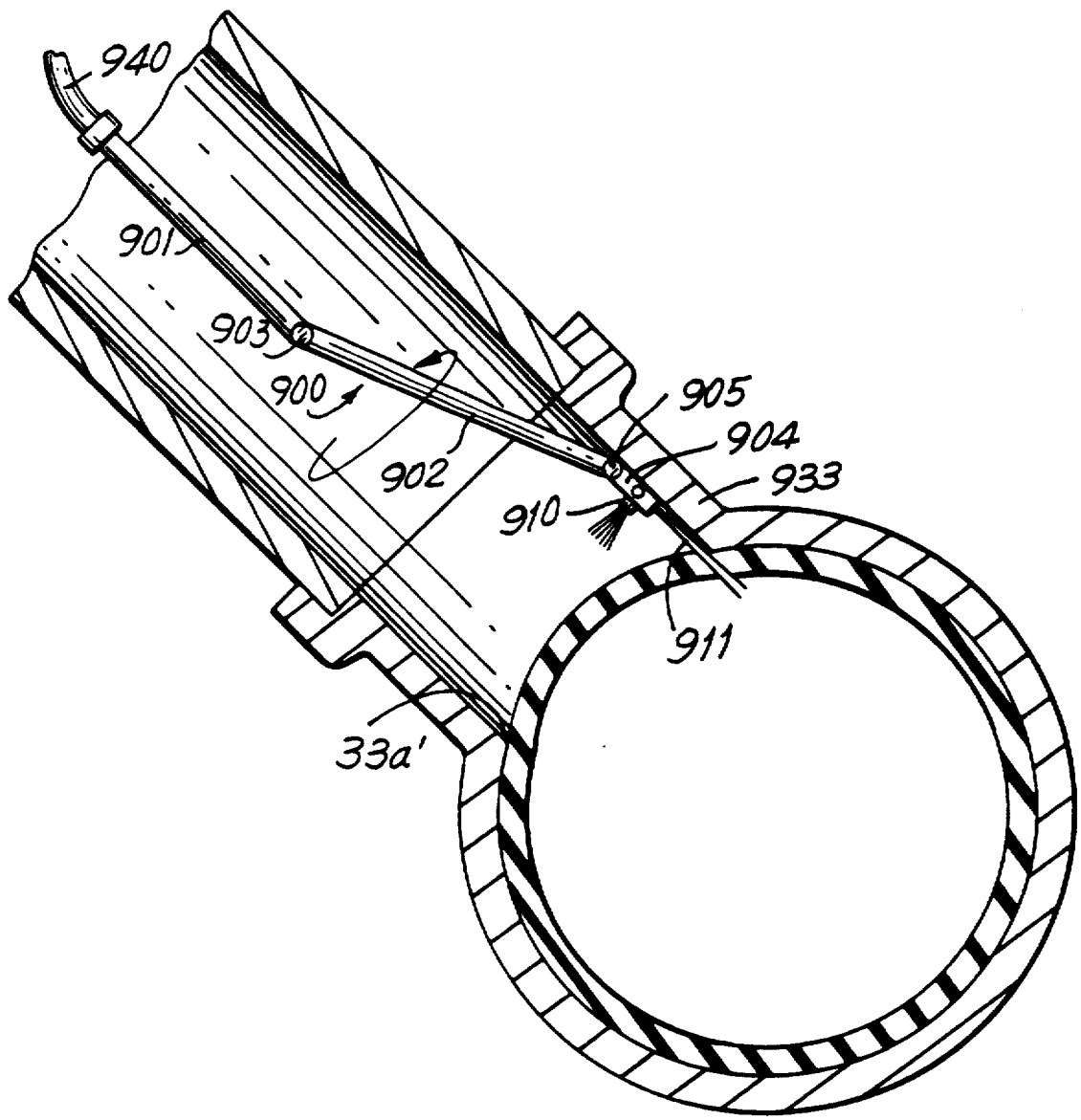
FIG. 10 is a side view of a water cutting apparatus constructed, in accordance with an embodiment of the invention.

Another cutting device for porting a lateral opening 33a is shown generally as straight cutter 900 in FIG. 10. Straight cutter 900 includes a first member 901 coupled to and in fluid communication with swing arm 902 by a hinge 903. A nozzle 904 is coupled to swing arm 902 by a hinge 905. Swing arm 902 should be longer than the width of the lateral to be ported.

Nozzle 904 can be formed with a side nozzle 910 for forcing nozzle 904 towards the side of a lateral 933 and a spin nozzle 911 for providing force to spin nozzle 904 around the inside wall of lateral 933. Fluid is supplied to straight cutter 900 by a hose 940 and cutting is accomplished as nozzle 904 travels around and parallel to the inside wall of lateral 933.

Figure 11:
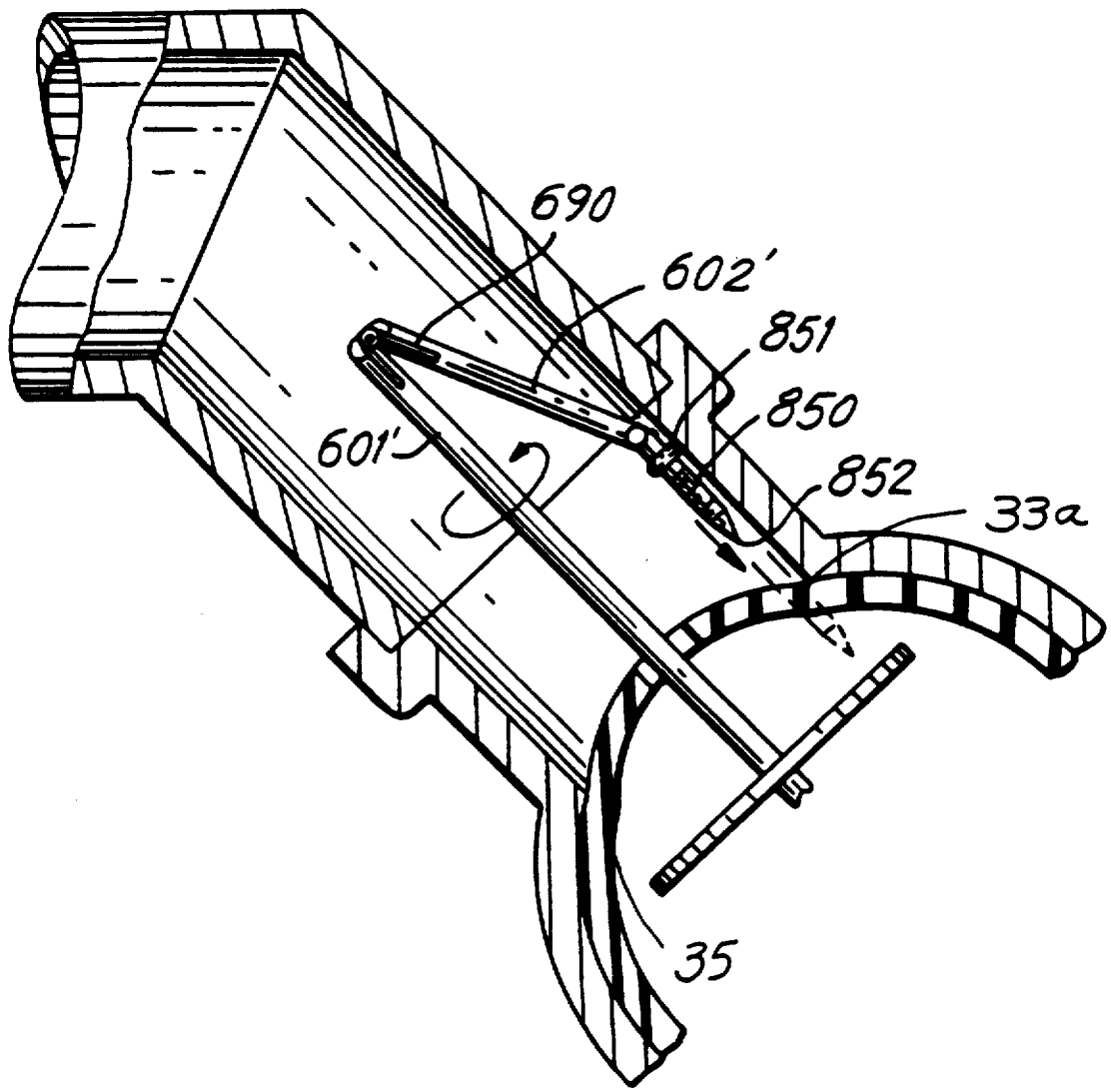
FIG. 11 is a side view of an apparatus for porting a lateral with router bit, constructed in accordance with another embodiment of the invention.

A lateral porting apparatus 700, which employs a router bit 850 is shown in FIG. 11. Apparatus 700 is similar in construction to apparatus 600 and includes arms 601' and 602' for extending through hole 51 into the lateral side of liner 35. Thereafter, arms 601 and 602 expand and press router bit 850 against the inner wall of lateral pipe 33. Apparatus 700 is then pulled back towards liner 35 so that a tip 852 of router bit 850 will cut through liner 35. Then, by rotating arm 601, router bit 850 will travel around opening 33a and will port opening 33a in a similar manner as the jet of water from nozzle 604 of water cutter 600. Apparatus 700 also includes a spring 690 for forcing arms 601' and 602' apart. Spring 690 can also be used to force arms 601 and 602 of water cutter 600 apart.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for cutting an opening in a liner of a conduit to make a lateral connection at the location where the installed liner covers side openings in the conduit which couples the conduit to lateral pipes, comprising:

location and positioning means for locating a lateral connection;

cutter means including a water cutter nozzle for cutting through the liner mounted on the location and positioning means;

insertion means for attaching the cutter means to the location and positioning means, the insertion means for extending through a hole in the liner and positioning the cutter means on the lateral side of the liner;

expanding means for urging the cutter means against the inside surface of the lateral pipe; and advancing means for displacing the cutter means around the inside circumference of the lateral pipe to cut the liner to the shape of the side opening in the conduit.

2. The apparatus of claim 1, wherein the nozzle is coupled to the insertion means with a mechanical arrangement so that it will be parallel to the inside surface of the lateral pipe when urged against the lateral pipe by the expansion means.

3. The apparatus of claim 2, wherein the insertion means includes a wing tube coupled to the nozzle by a pivotable coupling.

4. The apparatus of claim 3, wherein the insertion means includes an insertion tube of length greater than the wing tube plus the nozzle and coupled to the wing tube by a pivotable coupling.

5. The apparatus of claim 4, including separation means for spreading apart the wing tube and insertion tube, wherein the apparatus is constructed and arranged so that when fluid flows through the insertion tube, wing tube and nozzle, the wing tube will be urged away from the insertion tube to urge the nozzle against the inside surface of the lateral pipe due to the force of the flowing fluid.

6. The apparatus of claim 1, wherein the nozzle includes a side spout for urging the nozzle against the inside surface of the lateral pipe by the force of fluid exiting the side spout.

7. The apparatus of claim 4, wherein the insertion tube and wing tube include a spring mechanism to urge the wing tube away from the insertion tube.

8. The apparatus of claim 5, including a spring mechanism to urge the wing tube towards the insertion tube.

9. The apparatus of claim 1, including shield means for intercepting fluid from the nozzle after the jets of fluid break through the liner.

10. The apparatus of claim 1, wherein the water cutter nozzle includes spin nozzle means for directing water in a direction to cause the water cutter nozzle to spin around the inside of the lateral pipe.

11. A method of cutting an opening in a liner installed in a conduit at a location where the liner covers openings in the conduit where a lateral pipe is coupled to the conduit, comprising:

cutting a first hole in the liner at the region covering the lateral opening;

inserting cutting means including water cutter means for cutting the liner with a jet of fluid through the hole to the lateral side of the liner with the water cutter means facing towards the liner;

urging the cutting means against the inside surface of the lateral pipe;

advancing the cutting head along the inside surface of the lateral pipe and using the inside surface as a guide;

cutting a lateral opening through the liner corresponding to the original shape of the opening in the conduit from the lateral side of the liner by projecting a jet of fluid at the liner from the water jet cutter.

12. The method of claim 11, including forming a drain hole in the liner at the lower portion of the liner covering the lateral connection.

13. The method of claim 11, wherein the water cutter includes a nozzle facing the liner for blasting jets of fluid at the liner and cutting is achieved by advancing the nozzle along the inside circumference of the lateral pipe.

14. The method of claim 11, wherein cutting aid is included in the fluid.

15. The method of claim 11, wherein the cutting head is mounted on a hose passed through the hole and the nozzle is advanced along the inside circumference of the lateral pipe by rotating the hose.

16. The method of claim 11, wherein water spouting from a side of the nozzle provides force for advancing the cutter around the inside of the lateral.

17. An apparatus for cutting lateral opening in an installed conduit having a liner therein covering the lateral openings in the conduit for connecting the conduit to the laterals, comprising:

location and positioning means for locating the side openings in the conduit;

drill means for cutting a hole in the liner;

insertion means for inserting a cutting device from the conduit through the hole in the liner to the lateral side of the liner; and cutting means including water cutter means for cutting the liner with a stream of fluid adapted to face toward the outside of the liner for advancing along the inside surface of the lateral pipe and cutting the liner in the shape of the opening in the conduit from the lateral side of the liner as the cutting means advances.

18. A method of cutting a lateral in a conduit having a liner therein covering side openings in the conduit for connecting the conduit to the laterals, comprising:

positioning a water cutter device on the lateral pipe side of the liner; and cutting an aperture through the liner in the shape of the opening in the conduit by directing a jet of water at the liner and towards the conduit from the lateral side of the liner.

19. An apparatus for forming an opening in a liner of a conduit to make a lateral connection at the location where the installed liner covers side openings in the conduit to lateral pipes, comprising:

a first arm, a second arm coupled to the first arm by a hinge and the first and second arms in fluid communication with each other;

water cutting means for cutting through the liner with a jet of water coupled to the end of the second arm, the second arm and water cutter means configured so that the water cutter means is pressed against an inner wall of the lateral and directs a stream of fluid in a direction parallel with the inner wall of the lateral.

20. The apparatus of claim 19, wherein the second arm is longer than the diameter of the lateral.

21. The apparatus of claim 19, wherein the water cutter means includes a nozzle for ejecting a water stream for cutting the liner and side nozzle means for supplying force to urge the nozzle against the inside wall of the lateral by the force of water exiting the side nozzle means.

22. The apparatus of claim 19, including spin nozzle means for urging the water cutter means to spin around the inside of the lateral by the force of water exiting the spin nozzle means.

23. A method for cutting an opening in a liner installed in a conduit at a location where the liner covers openings in the conduit where a lateral pipe is coupled to the conduit, comprising:

feeding water cutter means for cutting through the liner through a lateral pipe towards the covered opening;

urging the water cutter means against the inside wall of the lateral pipe; and displacing the water cutter means around the inside wall of the lateral pipe while cutting through the liner from the lateral pipe side of the liner by use of a stream of fluid from the water cutter means and forming an opening in the liner that is the same shape as the connection of the lateral pipe and the conduit.

24. The method of claim 23, including the step of forming a drain hole through the liner.

25. The method of claim 23, wherein a cutting aid is included in the fluid to enhance the speed of cutting.

26. The method of claim 23, wherein water pressure is used to force the water cutter means against the inside wall of the lateral and displace the cutting means around the inside wall of the lateral.

27. An apparatus for forming an opening in a liner of a conduit to make a lateral connection at the location where the installed liner covers side openings in the conduit to lateral pipes, comprising:

a first arm and a second arm having two ends with a first end pivotally connected to the first arm;

cutting means for cutting through the liner pivotally connected to the second end of the second arm;

separation means for urging the first arm apart from the second arm and for urging the cutting means apart from second arm so that the cutting means is pressed against an inner wall of the lateral;

advancing means for displacing the cutting means around the inside surface of the lateral pipe to cut the liner to the shape of the side opening in the conduit.

28. A method of forming an opening in a liner installed in a conduit at a location where the liner covers an opening in the conduit where a lateral pipe is coupled to the conduit, comprising:

forming a first hole in the liner at the region covering the lateral opening;

inserting a cutting device through the first hole, the cutting device at the end of a jointed member which doubles back towards the liner after insertion through the first hole;

urging the cutting device against the inside surface of the lateral pipe by spreading apart the jointed member;

advancing the cutting device along the inside surface of the lateral pipe and using the inside surface as a cutting guide and forming a lateral opening through the liner corresponding to the original shape of the opening in the conduit, from the lateral side of the liner.

* * * * *